(12) United States Patent
Washisu

(10) Patent No.: US 7,925,144 B2
(45) Date of Patent: *Apr. 12, 2011

(54) IMAGE STABILIZING APPARATUS AND OPTICAL APPARATUS

(75) Inventor: Koichi Washisu, Suginami-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/558,371

(22) Filed: Sep. 11, 2009

(65) Prior Publication Data

US 2010/0074605 A1 Mar. 25, 2010

Related U.S. Application Data

(63) Continuation of application No. 11/671,711, filed on Feb. 6, 2007, now Pat. No. 7,609,950.

(30) Foreign Application Priority Data

Feb. 7, 2006 (JP) .................................. 2006-029966

(51) Int. Cl.
  *G03B 17/00* (2006.01)
(52) U.S. Cl. ....................................... 396/53; 348/208.2
(58) Field of Classification Search ..................... 396/52, 396/53, 55

See application file for complete search history.

(56) References Cited

U.S. PATENT DOCUMENTS

| | | | |
|---|---|---|---|
| 5,099,694 A * | 3/1992 | Sumio et al. ..................... | 73/654 |
| 6,233,009 B1 * | 5/2001 | Morofuji et al. ........... | 348/208.8 |
| 6,937,272 B1 * | 8/2005 | Dance ......................... | 348/208.2 |
| 7,324,134 B2 * | 1/2008 | Sato et al. ................... | 348/208.2 |
| 7,430,367 B2 * | 9/2008 | Imada ............................. | 396/55 |
| 7,460,772 B2 * | 12/2008 | Ishikawa et al. ................ | 396/52 |
| 2002/0159769 A1 * | 10/2002 | Fujinaga ........................ | 396/55 |
| 2006/0098967 A1 * | 5/2006 | Togawa ......................... | 396/55 |
| 2006/0104620 A1 * | 5/2006 | Ebato .............................. | 396/55 |

* cited by examiner

*Primary Examiner* — W. B. Perkey
*Assistant Examiner* — Dennis Hancock
(74) *Attorney, Agent, or Firm* — Canon U.S.A., Inc., IP Division

(57) ABSTRACT

An image stabilizing apparatus is disclosed which is capable of sufficiently correcting shift shakes even with a small and lightweight accelerometer. The apparatus includes an angular velocity detector which detects angular velocity generated by a shake, an angular velocity computing unit which processes an angular velocity signal, the unit processing the angular velocity signal with a first frequency characteristic, an acceleration detector which detects acceleration generated by the shake, an acceleration computing unit which processes an acceleration signal, the unit processing the acceleration signal with a second frequency characteristic having a signal processing band narrower than the first frequency characteristic, an adder which adds an output signal from the angular velocity computing unit to an output signal from the acceleration computing unit, and an image stabilizing mechanism which performs an image stabilizing operation based on an output signal from the adder.

3 Claims, 14 Drawing Sheets

IMAGE STABILIZING APPARATUS AND OPTICAL APPARATUS

CROSS REFERENCE TO RELATED APPLICATIONS

This application is a Continuation of U.S. patent application Ser. No. 11/671,711 filed Feb. 6, 2007, which claims priority from Japanese Patent Application No. 2006-029966 filed Feb. 7, 2006, the entire contents of both of which are hereby incorporated by reference.

BACKGROUND OF THE INVENTION

The present invention relates to an image stabilizing apparatus that corrects an image shake due to, for example, a hand shake to prevent degradation of a picked-up image, and an optical apparatus having the image stabilizing apparatus.

In current cameras, all important tasks for image pickup such as exposure decisions, focusing and the like are automated, so that even amateurs in camera operation are much less likely to fail in image pickup.

Recently, cameras provided with a system for preventing an image shake due to a hand shake have also been put on the market, virtually eliminating any factors that cause a photographer to fail in image pickup.

An apparatus for correcting image shakes, also referred to as image stabilizing apparatus, will now be briefly described.

A hand shake on a camera in image pickup is typically a shake from 1 Hz to 10 Hz in terms of a frequency.

In order to ensure that the camera can pick up an image without an image shake even if such a hand shake occurs when the shutter is released, the shake of the camera due to the hand shake must be detected and an image correction lens must be moved depending on the detected value.

Therefore, in order to pick up an image without the image shake even if a camera shake occurs, firstly the shake of the camera must be accurately detected, and secondly, the variation of the optical axis due to the hand shake must be corrected.

The detection of the shake (or camera shake) can be accomplished with a shake detector mounted on the camera. Fundamentally, the detector detects the acceleration, angular acceleration, angular velocity, angular displacement and the like, and appropriately computes the output for camera shake correction.

Based on the detection information, the image stabilizing apparatus that decenters the image pickup optical axis is driven to correct the image shake.

FIG. 10A shows a plan view of a conventional single-lens reflex camera, and FIG. 10B shows a side view of the same.

An image stabilizing system mounted on an interchangeable lens 90 that constitutes a part of the single-lens reflex camera system corrects an image due to camera shakes in the pitch and yaw directions indicated by arrows 92p and 92y, respectively, relative to an optical axis 91.

Incidentally, reference character 93a denotes a release member (or release button), 93b denotes a mode dial (including a main switch), 93c denotes a retractable flash, and 93d denotes a camera CPU provided in a camera body 93.

In FIGS. 10A and 10B, reference character 94 denotes an image pickup element, and 95 denotes an image stabilizing mechanism (or image stabilizer) that drives a correction lens 95a in the directions of arrows 95p and 95y in FIG. 10 to correct the shakes in the directions of arrows 92p and 92y. Reference characters 96p and 96y denote angular velocity meters that detect the shakes in the directions of arrows 92p and 92y, respectively. Arrows 96pa and 96ya indicate the respective sensitivity directions.

The output signals from the angular velocity meters 96p and 96y are input to a lens CPU 97 and converted thereby to a shake correction target value for the image stabilizing mechanism.

In synchronism with a half-press operation (which is hereinafter referred to as S1 and an operation that instructs the camera to perform photometering and focusing for the preparation of image pickup) of the release member 93a provided on the camera body 93, the shake correction target value is input to a coil in the image stabilizing mechanism through an image stabilizing driver 98 to start the shake correction.

The image stabilizing system illustrated in FIG. 10 uses the angular velocity meters 96p and 96y to detect hand shakes.

The camera body 93 is subjected not only to rotational shakes in the directions of arrows 92p and 92y but also to translational shakes indicated by arrows 11yb and 11pb. However, under a typical image pickup condition, the rotational shakes in the directions of arrows 92p and 92y are dominant, and the translational shakes indicated by arrows 11yb and 11pb cause less degradation of images.

Therefore, it is sufficient to provide only angular velocity meters 96p and 96y to detect hand shakes.

However, the degradation of images due to the translational shakes (hereinafter referred to as shift shakes) indicated by arrows 11yb and 11pb can not be ignored in close-up image pickup (or under an image pickup condition with large image pickup magnification).

For example, under a condition, such as macro image pickup, in which an image is picked up near a subject in the range on the order of 20 cm, or when the image pickup optical system has a very large focal length (for example, 400 mm) although the subject is located in the range on the order of 1 m, it is necessary to actively detect the shift shakes to drive the image stabilizing apparatus.

In Japanese Patent Laid-Open No. H07-225405, there has been disclosed a technique in which an accelerometer for detecting the acceleration is provided, and the shift shake is detected by the accelerometer to drive an image stabilizing apparatus along with an output from an angular velocity meter provided otherwise.

In the technique disclosed in the Japanese Patent Laid-Open No. H07-225405, the lens CPU converts the angular velocity meter output into an angle through a single integration, and converts the accelerometer output into a displacement through a double integration.

The integration operations suffer from the accumulation of slight errors in input signals, and the errors may significantly grow in the case of the double integration.

Therefore, an accelerometer that needs a double integration is required to be highly accurate.

However, there is a problem that such a highly accurate accelerometer is typically large and heavyweight and is not suitable for use in a consumer product.

BRIEF SUMMARY OF THE INVENTION

The present invention provides an image stabilizing apparatus capable of sufficiently correcting shift shakes even with a small and lightweight accelerometer, and an optical apparatus using the same.

According to one aspect, the present invention provides an image stabilizing apparatus which includes an angular velocity detector which detects angular velocity generated by a shake, an angular velocity computing unit which processes an angular velocity signal obtained by the angular velocity detector, the angular velocity computing unit processing the angular velocity signal with a first frequency characteristic, an acceleration detector which detects acceleration generated by the shake, an acceleration computing unit which processes an acceleration signal obtained by the acceleration detector, the acceleration computing unit processing the acceleration signal with a second frequency characteristic having a signal processing band narrower than the first frequency characteristic, an adder which adds an output signal from the angular velocity computing unit to an output signal from the acceleration computing unit, and an image stabilizing mechanism which performs an image stabilizing operation based on an output signal from the adder.

According to another aspect, the present invention provides an optical apparatus including the abovedescribed image stabilizing apparatus.

Other objects and features of the invention will be apparent from the preferred embodiments described below with reference to the drawings.

DETAILED DESCRIPTION OF THE PREFERRED EMBODIMENTS

The preferred embodiments of the present invention will now be described with reference to the accompanying drawings.

Embodiment 1

Figure 1A:
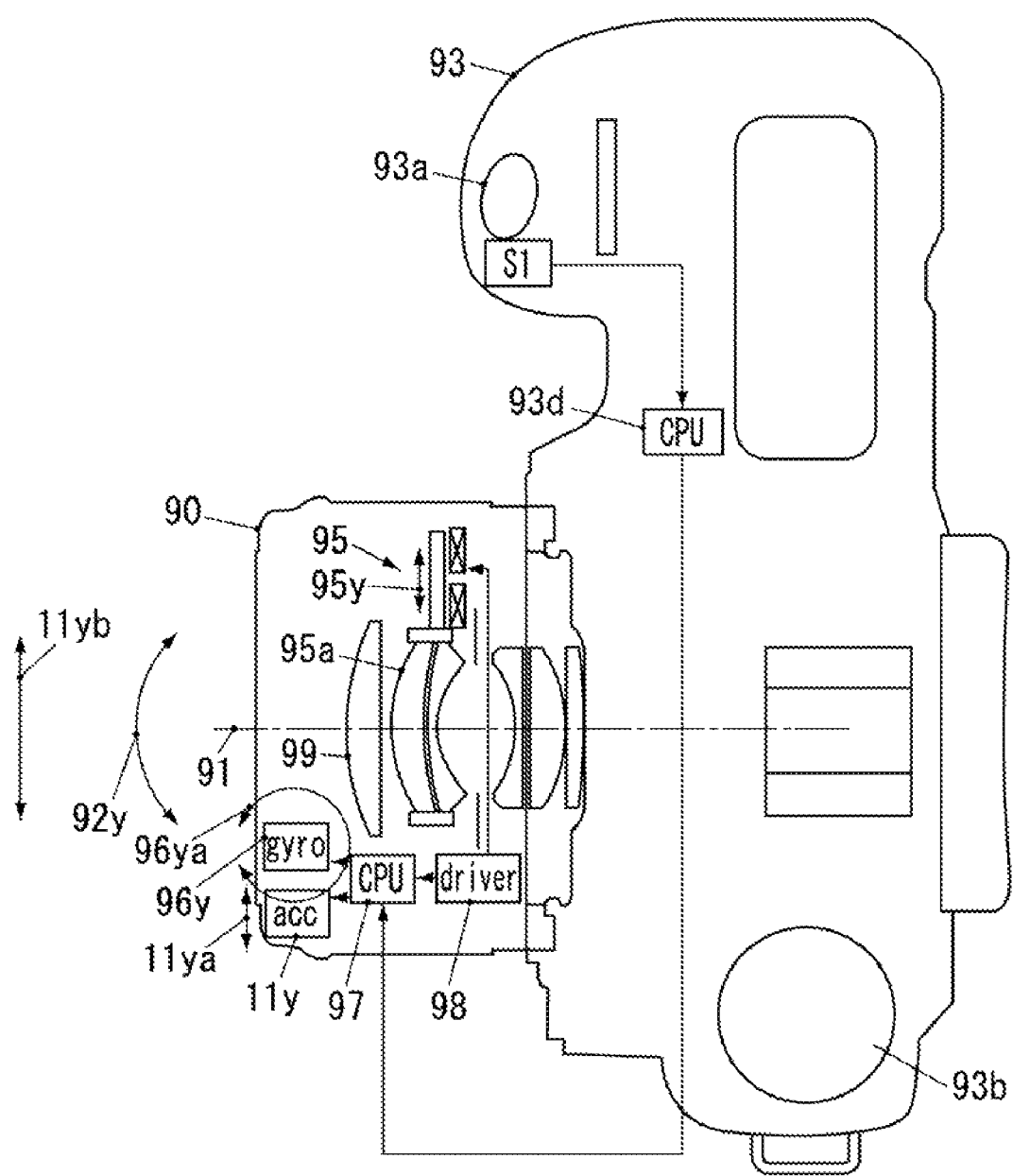
FIGS. 1A and 1B show a top view and a side view illustrating a digital single-lens reflex camera that is Embodiment 1 of the present invention, respectively.
Figure 1B:
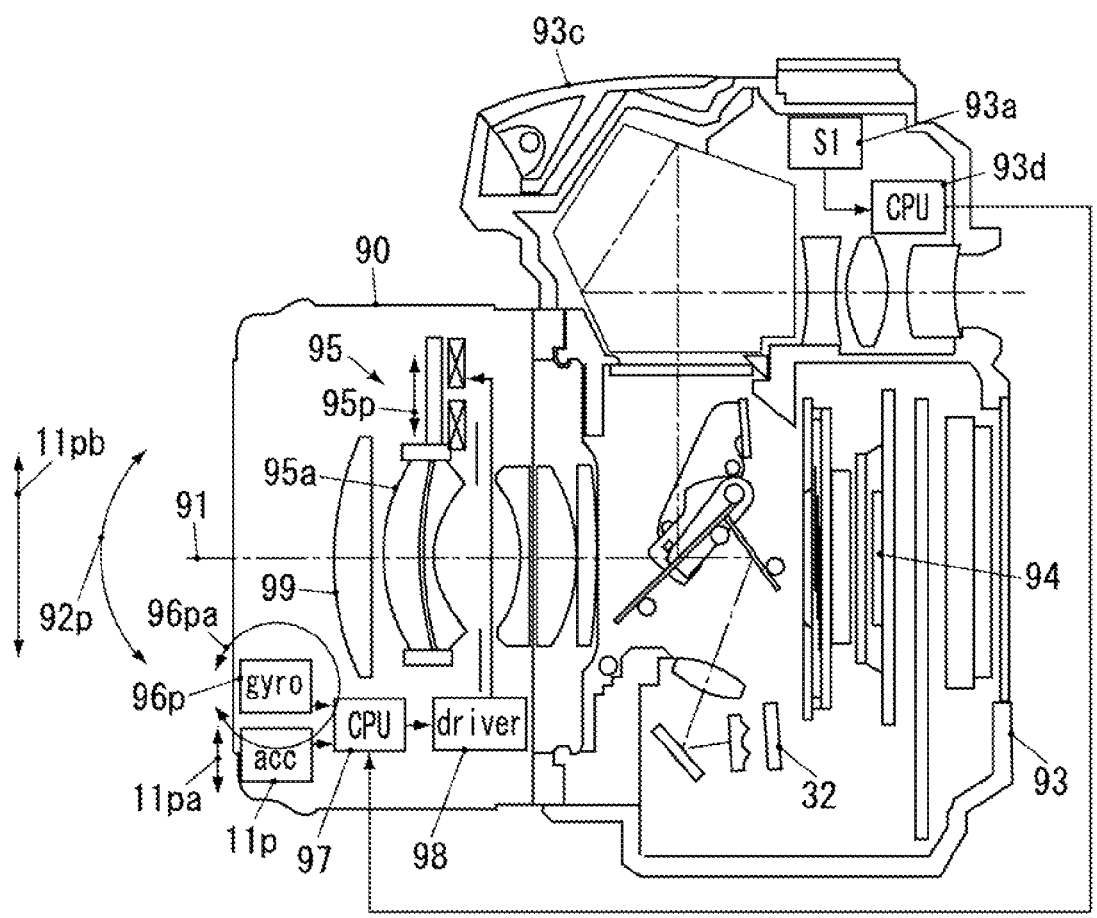

FIGS. 1A and 1B show a top view and a side view of a digital single-lens reflex camera system that is Embodiment 1 of the present invention, composed of an interchangeable lens (or optical apparatus, hereinafter simply referred to as a lens) 90 provided with an image stabilizing apparatus, and a camera body 93 on which the lens 90 is removably mounted.

Figure 10A:
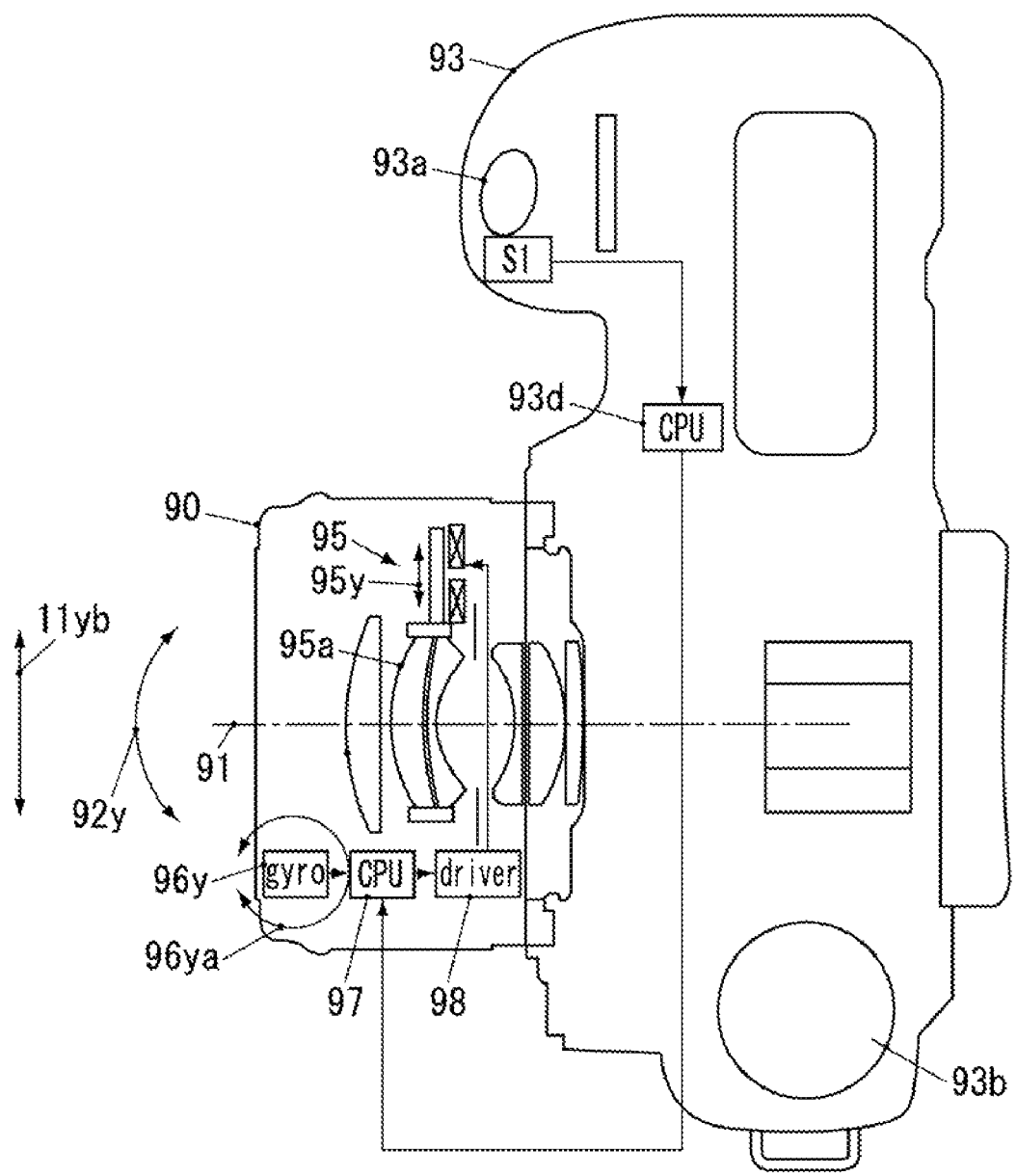
FIGS. 10A and 10B show a top view and a side view of a conventional digital single-lens reflex camera, respectively.
Figure 10B:
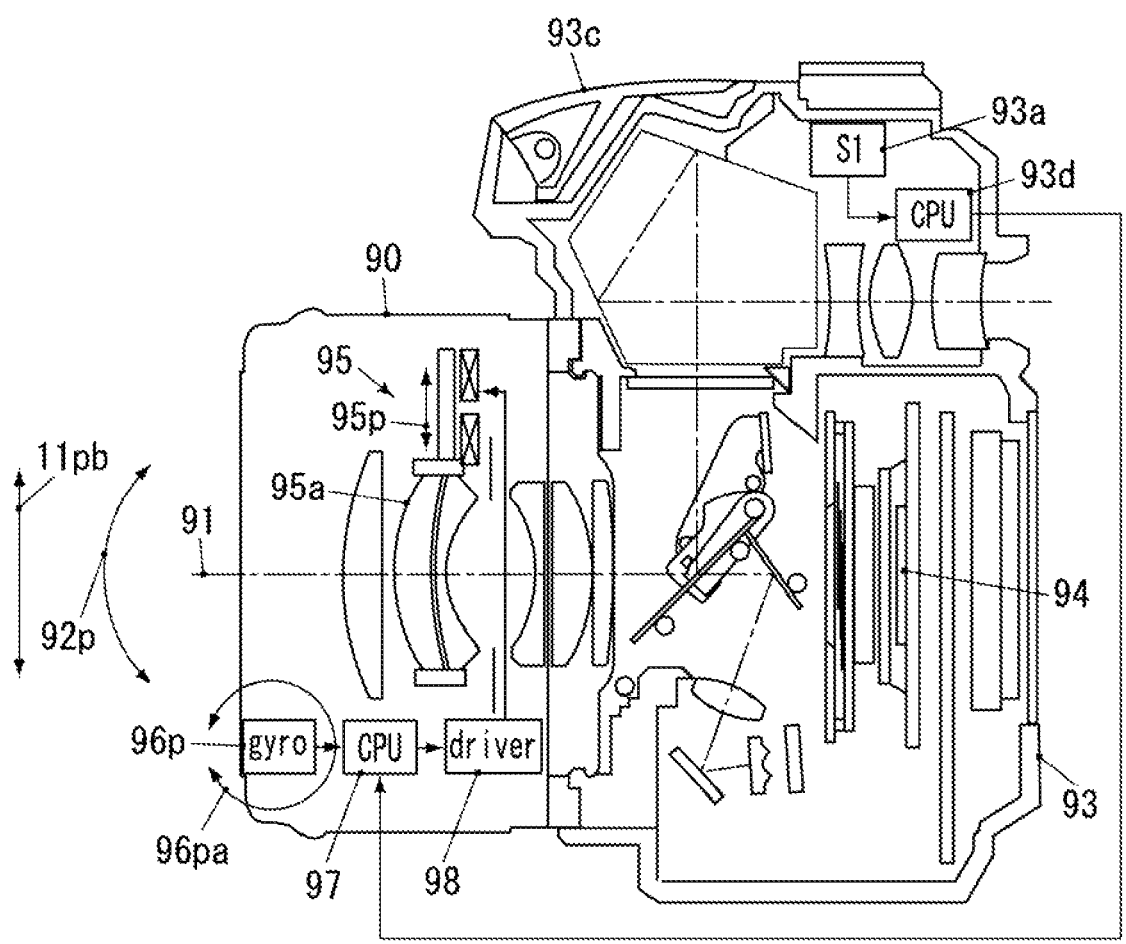

In this embodiment, components identical to those of the conventional camera system shown in FIGS. 10A and 10B are designated with the same reference characters. The embodiment is different from the conventional camera system in that the lens 90 is provided with accelerometers 11$p$ and 11$y$ in addition to angular velocity meters 96$p$ and 96$y$.

The detecting axes of the accelerometers 11$p$ and 11$y$ are shown by arrows 11$pa$ and 11$ya$, respectively. Reference character 99 denotes a focus lens, and multiple lens units including this focus lens constitute an image pickup optical system.

Figure 2:
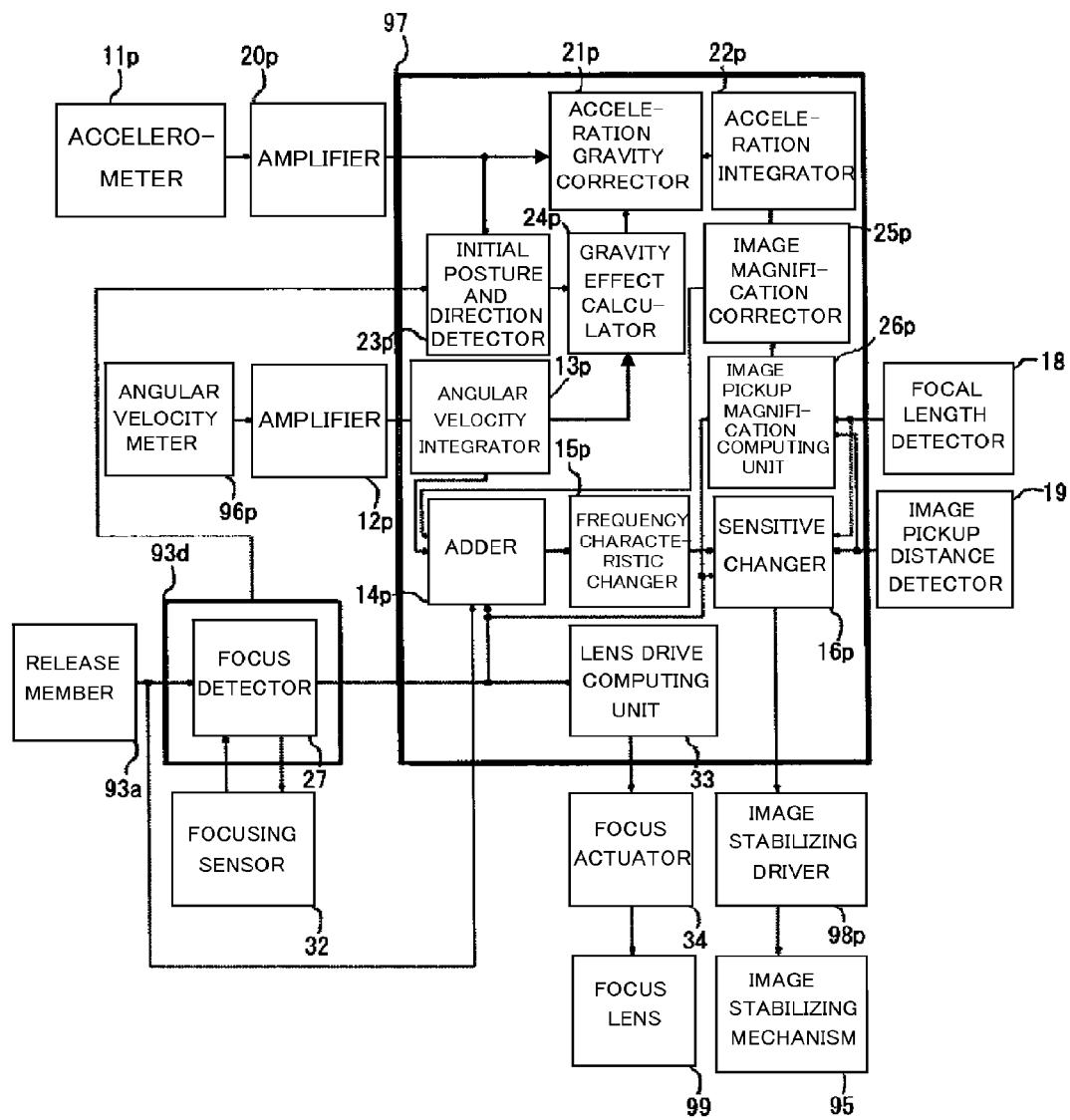
FIG. 2 shows a block diagram illustrating a circuit configuration of Embodiment 1.

FIG. 2 shows a block diagram illustrating a configuration of a circuit that processes signals of shift shakes detected by the accelerometers 11$p$ and 11$y$ and rotational shakes detected by the angular velocity meters 96$p$ and 96$y$. The signals are mostly processed in a lens CPU 97.

FIG. 2 shows only a signal processing flow for correcting an image shake due to a camera shake in the pitch direction (i.e. the rotational shake 92$p$ and the shift shake 11$pb$ in FIG. 1B). In practice, however, an image shake due to a camera shake in the yaw direction (i.e. the rotational shake 92$y$ and the shift shake 11$yb$ in FIG. 1A) is also corrected in a similar signal processing flow.

In FIG. 2, a shake angular velocity signal from the angular velocity meter 96$p$ is input to an amplifier 12$p$.

The amplifier 12$p$ amplifies output from the angular velocity meter 96$p$ and is provided with a DC removing circuit for removing a direct current (DC) component and a high-frequency attenuation circuit for removing a high-frequency noise component, the components being superimposed on the output of the angular velocity meter 96$p$.

The output from the amplifier 12$p$ is A/D converted and taken into the lens CPU 97.

The taken signal will be digitally processed in the lens CPU 97. Here, the process is shown divided into respective blocks for illustrative purpose.

An angular velocity integrator 13$p$ performs single integration on a shake angular velocity signal input from the amplifier 12$p$ to convert it into a shake angle.

The angular velocity integrator 13$p$ typically integrates high frequency components of approximately 0.1 Hz or higher of a shake angular velocity signal to convert it to a shake angle signal.

However, at the start of the angular velocity integration, the integration band is narrowed (for example, signals of 2 Hz or lower are attenuated) to accelerate activation of the signal processing (which is referred to as time-constant switching).

The resulting shake angle signal is input to an adder 14$p$, and added to a shake displacement signal described below to generate a total shake signal.

The adder 14$p$ adds the shake angle signal to the shake displacement signal described below based on signals from a release member 93$a$ and a focus detector 27, described below.

The shake angle signal is input to the adder 14$p$ in response to the half-press operation S1 (an operation for photometering and focusing) of the release member 93$a$. The adder 14$p$ adds the shake displacement signal to the shake angle signal based on a signal input (indicating completion of focusing) from the focus detector 27 to generate the total shake signal.

The total shake signal is input to a frequency characteristic changer 15$p$ to alter the frequency characteristics.

The frequency characteristic changer 15$p$ mainly attenuates low frequency components of the total shake signal. The frequency characteristic changer 15$p$ determines a frequency (for example, 0.1 Hz or 5 Hz) below which any frequencies are subjected to the attenuation and attenuates the signal components of the frequencies.

This is for preventing shake correction, that is, image stabilization, by increasing the level of attenuation of the total shake signal (for example, by attenuating signals of 5 Hz or lower) when a large shake such as a camera framing change occurs.

Without the frequency characteristic changer 15p, good camera framing cannot be achieved because even camera framing components are subjected to the shake correction.

The output from the frequency characteristic changer 15p is input to a sensitivity changer 16p.

The sensitivity changer 16p receives signals from a focal length detector 18 and an image pickup distance detector 19, which are input to the lens CPU 97, to alter the amplification factor (or gain) for the signal from the frequency characteristic changer 15p.

Here, the shake correction sensitivity of the correction lens 95a, which is included in the image pickup optical system as a zoom lens as shown in the embodiment, varies depending on a zooming state or a focusing state.

For example, when the correction lens 95a driven by 1 mm on the wide-angle side causes an image shift of 1 mm on an image plane, the correction lens 95a driven by 1 mm on the telephoto side causes an image shift of 3 mm on the image plane.

Similarly, the relationship between the movement amount of the correction lens 95a and the amount of image shift varies whether a subject is closely located or a subject is located in infinity.

Therefore, in order to correct the sensitivity, the amplification factor for the signal from the frequency characteristic changer 15p is altered depending on the zooming state or the focusing state (for example, the amplification factor on the telephoto side is reduced to one-third of that on the wide-angle side)

The focal length detector 18 is provided in the lens 90 and is an encoder and the like that detects the position of a magnification varying lens (not shown) which is moved when zooming. The focal length is detected using output from the encoder or the like.

The image pickup distance detector 19 is also provided in the lens 90 and is an encoder and the like that detects the position of a focus lens 99 which is moved when focusing. The image pickup distance is detected using output from the encoder or the like.

With an operation (half-press operation S1) of the release member 93a for preparation of image pickup, a shake correction target signal from the sensitivity changer 16p is converted to a PWM signal and input to the image stabilizing driver 98p.

The image stabilizing driver 98p operates the image stabilizing mechanism 95 (that is, the correction lens 95a) in response to the input PWM signal so that the mechanism shifts relative to the optical axis 91 to effect the shake correction.

At this time, only a shake angle signal is input to the adder 14p, and therefore, only the rotational shake is corrected.

In addition, in response to a half-press signal generated by the half-press operation S1 of the release member 93p, the focus detector 27 in the camera CPU 93d activates a focusing sensor 32 in the camera body 93 to detect the focusing state with respect to a subject.

Depending on the detected result of the focusing sensor 32, the focus detector 27 sends the amount of out-of-focus to a lens drive computing unit 33 in the lens CPU 97.

The lens drive computing unit 33 drives a focus actuator 34 based on the signal to move the focus lens 99.

Here, since the rotational shake is being corrected during the focusing operation as described above, highly accurate focusing operation can be achieved.

After the drive of the focus lens 99, the focusing sensor 32 again detects the focusing state, and the camera CPU 93d provides an in-focus indication if a sufficient focusing state (or an in-focus state) is obtained. On the other hand, the camera CPU 93d moves the focus lens 99 again if the sufficient focusing state is not obtained.

In the sufficient focusing state, the focus detector 27 causes the adder 14p to add the shake displacement signal to the shake angle signal.

Although the movement amount of the focus lens 99 is continuously input to the sensitivity changer 16p, the sensitivity changer 16p uses as the sensitivity value the movement amount of the focus lens 99 at the time of the focus detector 27 detecting the in-focus state.

The image magnification is computed from the relationship between the movement amount of the focus lens 99 and the position of the magnification varying lens, and the computation of the image magnification is started using the in-focus detection by the focus detector 27 as a trigger, as described below.

That is, when the zooming state is fixed (it is assumed that the zooming state is fixed before the half-press operation S1 of the release member 93a by the photographer) and the focusing state is in focus on the subject and thereby the movement amount of the focus lens 99 is determined, the sensitivity for the shake correction is determined and then the shake correction target value is calculated.

The image magnification is also determined when the focusing state is in focus on the subject.

The shake correction target signal determined as described above, given by adding the shake displacement signal to the shake angle signal, is converted to a PWM signal, and then the PWM signal is input to the image stabilizing driver 98p.

The image stabilizing driver 98p activates the image stabilizing mechanism 95 (that is, the correction lens 95a) in response to the input of the PWM signal to perform the shake correction.

In other words, upon the completion of focusing, the shift shake is also corrected.

The signal processing for an accelerometer 11p will now be described.

A shake acceleration signal output from the accelerometer 11p is input to an amplifier 20p.

The amplifier 20p amplifies output from the accelerometer 11p and is provided with a DC removing circuit for removing a DC component and a high-frequency attenuation circuit for removing a high-frequency noise component, the components being superimposed on the output of the accelerometer 11p.

The output from the amplifier 20p is A/D converted and taken into the lens CPU 97.

The taken shake acceleration signal will also be digitally processed in the lens CPU 97. Again, the process is shown divided into respective blocks for illustrative purpose.

First, the shake acceleration signal is input to an acceleration gravity corrector 21p to perform correction of a gravitational component.

Here, description will be made what the correction of gravitational component means.

Figure 3A:
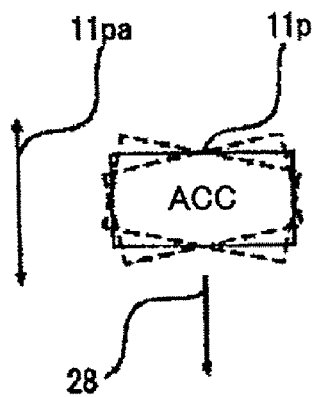
FIGS. 3A to 3C illustrate gravitational errors added to an accelerometer in Embodiment 1.

At the image pickup position of the camera shown in FIG. 1B, the sensitivity direction 11pa of the accelerometer 11p is the same as the direction of the gravity 28 because the camera is horizontal (see FIG. 3A).

At this time, the accelerometer 11p continuously outputs a signal corresponding to the gravitational component, and a shift shake component is detected from the signal superimposed on the gravitational component.

Since an output signal of the gravitational component is a DC component, it can be removed by the DC removing circuit and the like in the amplifier 20p.

However, the position of the accelerometer 11p varies as indicated by a dashed line in FIG. 3A due to a change in a rotating angle of a hand shake generated when the camera is gripped, so that the direction of the gravity will vary as viewed from the accelerometer 11p.

Therefore, the output from the accelerometer 11p varies due to a change in the shake angle.

Figure 3B:
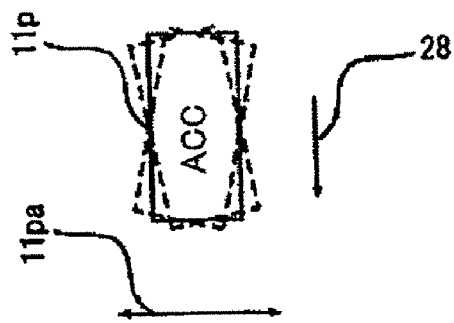
Figure 3C:
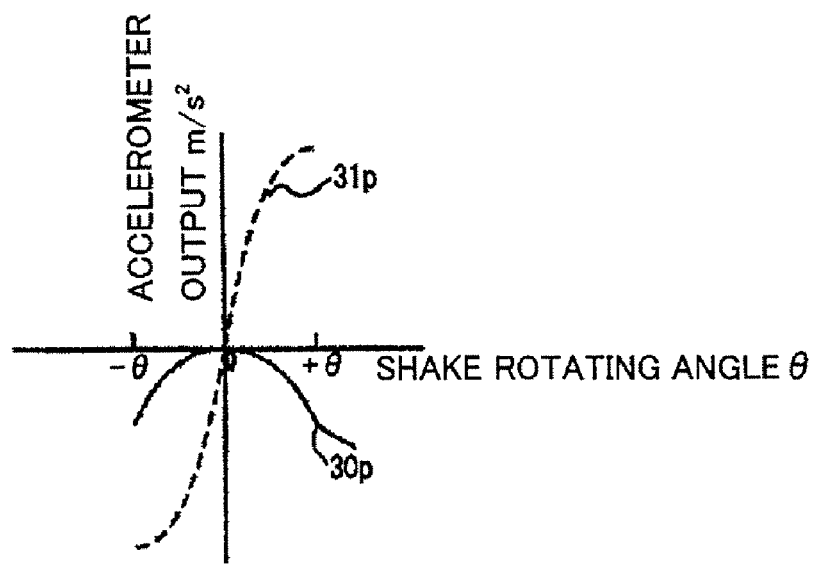

FIG. 3C shows a variation of the output from the accelerometer 11p with respect to a posture (or shake rotating angle θ) of the accelerometer 11p; the horizontal axis shows a posture variation of the accelerometer 11p and the vertical axis shows the output from the accelerometer 11p.

A graph 30p shows the output from the accelerometer 11p. As the posture angle of the accelerometer 11p increases or decreases from zero (a state when 1G is applied as shown in FIG. 3A) by ±θ, the output from the accelerometer 11p changes (or decreases).

Figure 4:
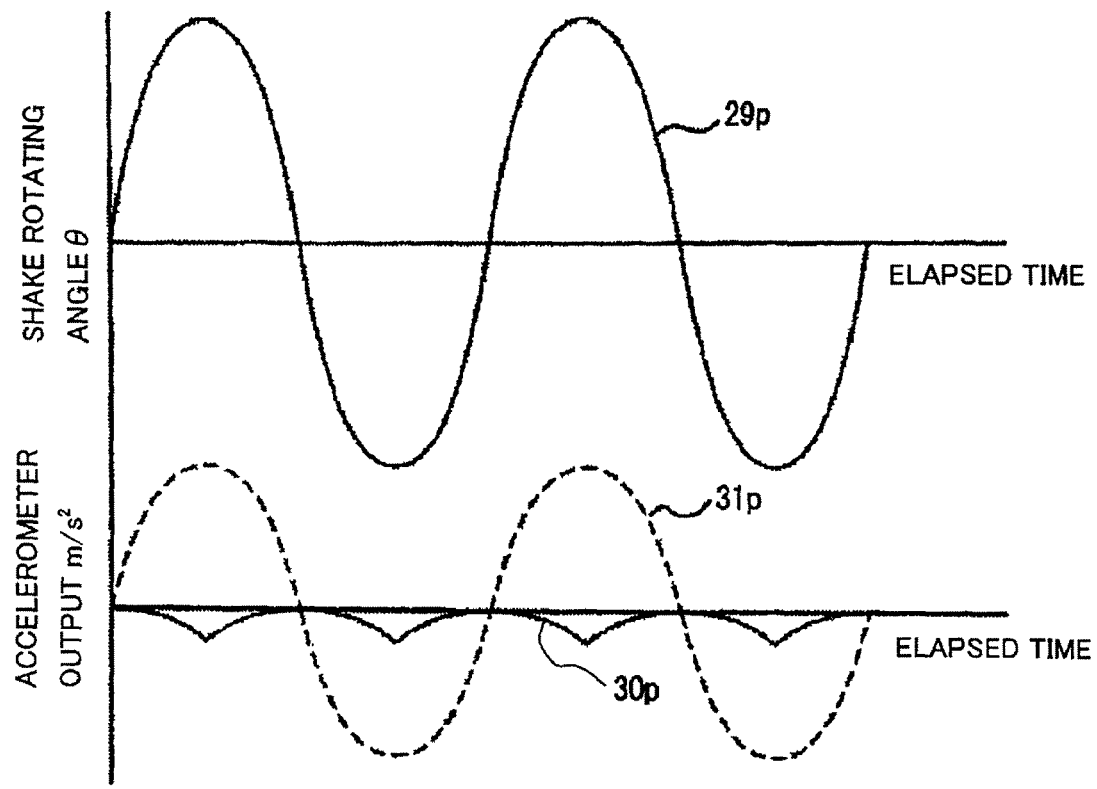
FIG. 4 illustrates a gravitational error depending on a shake angle in Embodiment 1.

FIG. 4 shows the output from the accelerometer 11p with a gravitational variation where the horizontal axis shows elapsed time after the camera is gripped and the vertical axis shows the shake rotating angle and the output from the accelerometer 11p.

Assuming there is no shift shake, the accelerometer 11p still outputs an error signal 30p due to a variation in the gravitational component generated depending on a shake rotating angle 29p.

In close-up image pickup, the camera is often tilted down to pick up an image. FIG. 3B shows such a case, and the direction of the gravity 28 is perpendicular to the sensitivity direction 11pa of the accelerometer 11p.

In this case, the error signal is as indicated by dashed line graph 31p shown in FIGS. 3C and 4.

Here, there is a difference in the level of the error signals 30p and 31p between the position of the accelerometer 11p in FIG. 3A and the position of the accelerometer 11p in FIG. 3B because the gravity affects the error signal in a cosine manner with respect to a change in the shake angle at the position in FIG. 3A. At the position in FIG. 3B, the gravity affects the error signal in a sine manner, and the variation will be larger in the sine manner when the angle of posture change is small.

Therefore, in order to correct (remove) the gravitational effect, it is necessary to detect the shake angle and the posture (or the sensitivity axis angle with respect to the gravity as shown in FIGS. 3A and 3B) of the accelerometer 11p.

Returning to FIG. 2, a half-press signal from the release member 93a is input to the lens CPU 97 through the camera CPU 93d.

The half-press operation S1 is performed after the camera is pointed at a subject for the preparation of image pickup and an image composition is fixed, and the half-press signal causes photometering and focusing with respect to the subject to start.

In FIG. 2, the above operations are omitted because they are not directly relevant to the feature of this embodiment, and the half-press signal from the release member 93a is input to an initial posture and direction detector 23p through the camera CPU 93d.

The initial posture and direction detector 23p also receives an input of an amplified acceleration signal from the amplifier 20p, and determines the posture of accelerometer 11p according to the magnitude of the amplified acceleration signal when the half-press signal from the release member 93a is input.

Since the half-press operation S1 on the release member 93a is a button manipulation performed by a photographer after the image composition is fixed, the posture is not widely changed thereafter.

Therefore, it is effective to determine the posture of the accelerometer 11p based on the amplified acceleration signal.

The posture may of course be detected after the half-press operation S1 and then the camera focuses on a subject. In this case, however, the integration of the output from the accelerometer 11p (described below) cannot be performed using the time interval between the half-press operation S1 and focusing.

Therefore, it is desirable to detect the posture of the accelerometer 11p during the half-press operation S1 in order also to save time.

Specifically, it is determined that the accelerometer 11p has the posture shown in FIG. 3A when the magnitude of the acceleration is 1G upon input of the half-press signal, that it has the posture shown in FIG. 3B when it is 0G, and that it has a posture corresponding to an acceleration between 1G and 0G.

The shake angle signal from the angular velocity integrator 13p is input not only to the abovedescribed adder 14p but also to a gravitational effect calculator 24p.

The gravitational effect calculator 24p calculates a variation in the gravity acting on the accelerometer 11p based on a change in the input shake angle signal. As described above, the calculation varies depending on the posture of the accelerometer 11p with respect to the gravity, that is, depending on whether the sine manner or the cosine manner is used in the calculation.

Therefore, a signal from the initial posture and direction detector 23p is also input to the gravitational effect calculator 24p to change a coefficient in the calculation between the posture shown in FIG. 3A and the posture shown in FIG. 3B.

Specifically, when the posture φ is zero degree while 1G is applied as shown in FIG. 3A and a change in the posture (or shake rotating angle) is θ, the change in output from the accelerometer 11p is determined as:

$$G\{\cos\phi - \cos(\phi+\theta)\}.$$

Therefore, an initial posture φ determined by the initial posture and direction detector 23p and a current shake angle are used to determine a posture change θ, which is used to calculate a gravitational effect.

The amplified acceleration signal from the amplifier 20p is input to the acceleration gravity corrector 21p, where the amplified acceleration signal is used to calculate the difference from the signal from the accelerometer 11p which is changed in association with a gravitational variation obtained by the gravitational effect calculator 24p to remove an output error in the accelerometer 11p due to the gravity.

A shake acceleration signal after removal of the error component is input to an acceleration integrator 22p.

The acceleration integrator 22p performs a double integration on the shake acceleration signal in which the gravitational effect was corrected by the acceleration gravity corrector 21p to convert the shake acceleration signal to a shake displacement.

Similarly to the angular velocity integrator 13p, the acceleration integrator 22p typically performs a double integration on a high frequency component of 0.4 Hz or higher of the shake acceleration signal to convert the high frequency component to the shake displacement.

At the start of the acceleration signal integration, the acceleration integrator 22p narrows the integration band (for example, only a component of 1 Hz or higher is integrated) to accelerate activation of the signal processing (i.e. time-constant switching).

The shake displacement signal from the acceleration integrator 22p is input to an image magnification corrector 25p.

An image pickup magnification computing unit 26p calculates an image pickup magnification based on focal length information from the focal length detector 18 and image pickup distance information from the image pickup distance detector 19.

As described above, the focal length detector 18 is provided in the lens 90 and is an encoder and the like that detects the position of the magnification varying lens which is moved when zooming. The focal length is detected using output from the encoder or the like.

The image pickup distance detector 19 is also provided in the lens 90.

The image pickup distance detector 19 is an encoder and the like that detects the position of the focus lens 99 which is moved when focusing. The image pickup distance is detected using output from the encoder or the like.

The focus lens 99 is driven based on information on the amount of out-of-focus from the focus detector 27 as described above, and after the completion of the drive and when the focus detector 27 confirms an in-focus state, the image pickup magnification computing unit 26p computes an image pickup magnification based on the outputs from the focal length detector 18 and the image pickup distance detector 19.

The shift shakes 11pb and 11yb will have a large effect on a picked-up image when a subject is closely located and the image pickup focal length is large (i.e. in the case of a large image pickup magnification), and have a much less effect on the picked-up image when the subject is distantly located (i.e. in the case of a small image pickup magnification).

Therefore, it is necessary to amplify the shake displacements (or the shift shakes), which have been detected by the accelerometers 11p and 11y and then computed, depending on the image pickup magnification to obtain shake correction target values.

The image magnification corrector 25p amplifies the shake displacement from the acceleration integrator 22p based on a computed value (computed assuming that the image pickup magnification is large when the focal length is large and the subject is closely located) from the image pickup magnification computing unit 26p.

The adder 14p adds the signal from the angular velocity integrator 13p to the signal from the image magnification corrector 25p (the signal based on the acceleration integrator 22p). However, substantially only the output from the angular velocity integrator 13p will remain when the subject is distantly located and the image pickup focal length is small, as described above.

The operation following the adder 14p is as described above: the output from the adder 14p is converted to a shake correction target value through the frequency characteristic changer 15p that facilitates a camera framing change and the sensitivity changer 16p that adjusts the effectiveness of the shake correction depending on the sensitivity of the correction lens 95a, and is used to drive the image stabilizing mechanism 95.

Figure 5:
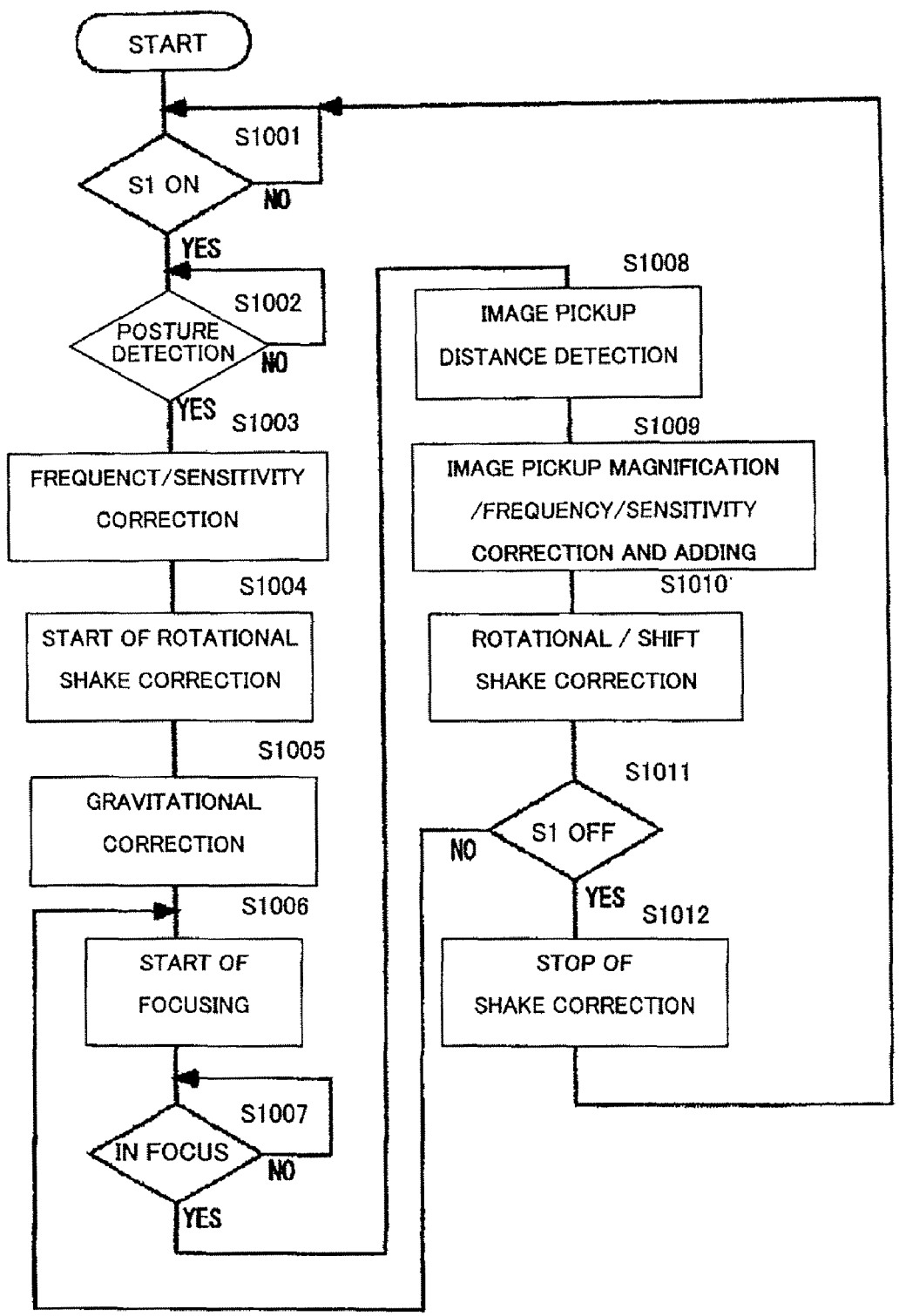
FIG. 5 shows a flow chart illustrating the operation of the camera in Embodiment 1.

FIG. 5 shows a flow chart illustrating the operation of the configuration described above. The flow starts when the main power of the camera body 93 is turned on and power supply to the lens 90 is started.

Various control steps provided for the camera (for example, battery checking, photometering, focus detection, drive of the focus lens for auto-focusing, charging for flashing, and manipulations and operations for exposure) are omitted for clear understanding of major operations of Embodiment 1.

In this flow, description will be made of an example case where the rotational shake 92p and the shift shake 11pb of the camera are detected by the angular velocity meter 96p and the accelerometer 11p, respectively. However, a similar flow may be applied to the case where the rotational shake 92y and the shift shake 11yb of the camera are detected by the angular velocity meter 96y and the accelerometer 11y, respectively.

At step S1001, the half-press operation S1 of the release member 93a is waited for, and upon the half-press operation S1, the flow proceeds to step S1002.

At step S1002, the initial posture and direction detector 23p detects the posture of the camera according to a signal from the accelerometer 11p.

This detects a gravity acceleration acting on the accelerometers 11p and 11y, and as shown in FIGS. 1A and 1B for example, the accelerometer 11p outputs a signal corresponding to 1G and the accelerometer 11y outputs a signal corresponding to 0G when the camera is horizontally gripped.

At this time, if the camera is turned to be in a vertical posture (i.e. the right and left sides of the camera towards up and down), the accelerometer 11p outputs a signal corresponding to 0G and the accelerometer 11y outputs a signal corresponding to 1G.

When the camera is tilted down or up, both the accelerometers 11p and 11y output signals corresponding to 0G.

The posture is detected at the time of the half-press operation S1 of the release member 93a because a photographer tends to first grip the camera, fix the framing, and then perform the half-press operation S1 after the camera is stabilized, so that the posture may not be often changed thereafter.

If it is determined that the posture is as shown in FIG. 1A based on the signals from the accelerometers 11p and 11y, gravity correction is applied to the accelerometer 11p. However, a gravitational effect calculator 24y determines that the gravity correction is not applied to the accelerometer 11y, and nulls the correction amount for an acceleration gravity corrector 21y. This is because there is essentially no variation in the gravity acceleration due to rotational shakes.

Therefore, the acceleration gravity corrector 21y (not shown and having the similar configuration to the acceleration gravity corrector 21p in order to correct a gravitational effect on the accelerometer 11y) does not perform a gravitational component correction (or the gravity correction) on an amplified signal from the accelerometer 11y.

In contrast, when the camera is in another vertical posture (the accelerometer 11p→0G; the accelerometer 11y→1G), the gravity correction is applied to the accelerometer 11y based on the signal from the angular velocity meter 96y, while the gravity correction is not applied to the accelerometer 11p based on the signal from the angular velocity meter 96p.

The gravitational effect calculator 24p nulls the correction amount for the acceleration gravity corrector 21p.

When the camera is tilted down or up (the accelerometer 11p→1G; the accelerometer 11y→1G), the gravity correction is applied to the accelerometer 11p based on the signal from the angular velocity meter 96p, and the gravity correction is applied to the accelerometer 11y based on the signal from the angular velocity meter 96y.

In this way, it is determined whether or not the gravity correction is performed depending on the posture.

In addition to the gravity acceleration, an acceleration due to the shift shake is superimposed on the signals from accelerometers 11p and 11y.

Therefore, each signal from each of the accelerometers 11p and 11y is averaged for a predetermined time (for example, 1 second) to obtain only a gravitational component.

When the posture detection is completed in this way, the flow proceeds to step S1003.

At step S1003, sensitivity correction depending on the state of the focus lens 99 and frequency correction depending on the state of the shake (such as panning) are applied to the shake angle signal.

At step S1004, the rotational shake correction is performed based on the shake angle signal.

At step S1005, the gravitational effect calculator 24p calculates the gravity acceleration acting on the accelerometer 11p based on the posture of the camera detected by the initial posture and direction detector 23p and the shake angle information from the angular velocity integrator 13p, and the acceleration gravity corrector 21p corrects the error output.

At step S1006, focusing is started.

At step S1007, completion of the lens movement for focusing is waited for. The wait time continues until the focus detector 27 detects the in-focus state, the lens drive computing unit 33 computes the lens movement amount, the focus lens actuator 34 drives the focus lens 99, and then the focusing sensor 32 confirms that the in-focus state on a subject is achieved.

At step S1008, the position of the focus lens 99 is read by the focus encoder that is the image pickup distance detector 19 upon completion of the drive of the focus lens 99 at step S1007 to detect the image pickup distance (or object distance).

At step S1009, focal length information of the lens 90 is detected by the zoom encoder that is the focal length detector 18, and the image pickup magnification computing unit 26p computes the image pickup magnification in relation to the image pickup distance determined at step S1008. The image magnification corrector 25p then alters the gain for the shake displacement obtained by the acceleration integrator 22p, based on the result from the image pickup magnification computing unit 26p.

The resulting shake displacement is added to the shake angle signal from the angular velocity integrator 13p by the adder 14p. The frequency characteristic changer 15p to which the addition output is input changes the shake correction frequency band depending on the image pickup condition. The sensitivity changer 16p alters the gain for the output in which the shake correction frequency band was changed, based on the abovedescribed shake correction sensitivity determined based on the detection results from the focal length detector 18 and the image pickup distance detector 19, and thereby the shake correction target value is calculated.

At step S1010, the image stabilizing driver 98p start driving the image stabilizing mechanism 95 according to the determined shake correction target value to perform the shake correction.

The corrections are performed for both the rotational shake and the shift shake for the first time hereat.

At step S1011, if the half-press operation S1 of the release member 93a is changed to off, the flow proceeds to step S1012, and if the half-press operation S1 is continued, the flow returns to step S1006.

In other words, the shake correction is continued with the gain of the shake correction target value altered depending on the image magnification and/or the sensitivity that change depending on the image pickup distance (or object distance), as long as the half-press operation S1 is continued, and it is assumed that, during the shake correction, there is no variation in the posture of the accelerometer 11p.

Incidentally, if the lens 90 is in-focus state, the focus lens 99 is not driven for focusing, and if an in-focus state is not detected (for example, the subject is moved), the focus lens 99 is driven for focusing at step S1007 and the image pickup distance is again detected to alter the image pickup magnification at step S1008.

At step S1012, the drive of the image stabilizing mechanism 95 is stopped, and the flow returns to step S1001 to wait for the half-press operation S1 is performed again.

As described above, in Embodiment 1, only rotational shakes are first corrected, and then shift shakes are corrected.

Since the rotational shake has been corrected before focusing, the focusing accuracy can be increased and accurate information needed for the shift shake correction (i.e. image pickup magnification) can be obtained.

The details of the angular velocity integrator 13p and the acceleration integrator 22p shown in FIG. 2 will now be described.

As described above, the angular velocity integrator 13p typically integrates a high frequency component of 0.1 Hz or higher to convert it to the shake angle signal, and the acceleration integrator 22p typically integrates a high frequency component of 0.4 Hz or higher to convert it to the shake displacement signal.

Figure 6A:
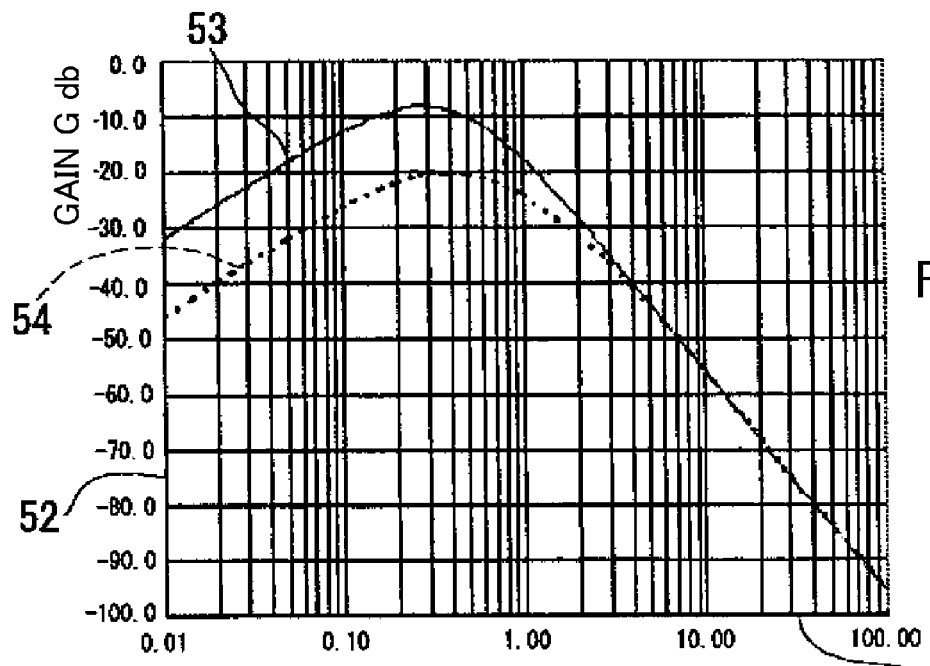
FIGS. 6A to 6D illustrate the frequency characteristics of an acceleration computing unit and an angular velocity computing unit in Embodiment 1.
Figure 6B:
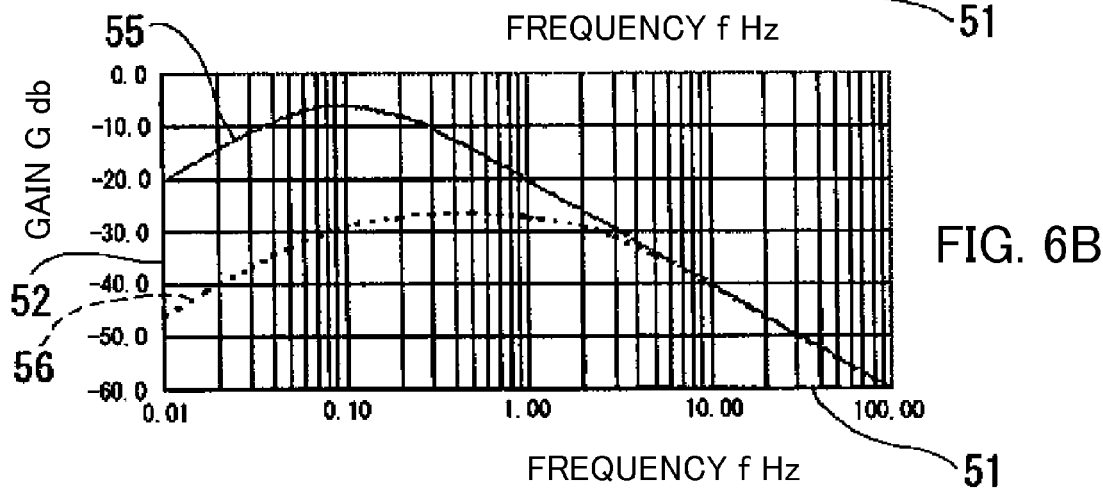

FIGS. 6A and 6B show gain integration characteristics of the acceleration integrator 22p and the angular velocity integrator 13p, respectively; the horizontal axis 51 shows the frequency, and the vertical axis 52 shows the gain. The gain represents a ratio of the magnitude of an output signal to an input signal in terms of dB.

In FIG. 6A, a graph 53 shows the frequency characteristics in the acceleration integration in the normal state. The acceleration integrator 22p has a characteristic which performs a double integration on a frequency component higher than 0.4 Hz (i.e. the acceleration signal decreases in an inversely proportional manner to the square of the frequency), and attenuates a frequency component lower than 0.4 Hz (practically, a frequency component lower than 0.3 Hz: the acceleration signal decreases as the frequency is lowered).

A graph 54 shows the frequency characteristics in the acceleration integration upon activation of the accelerometer 11p or when panning. Similarly to the graph 53, the acceleration integrator 22p has a characteristic which performs a double integration on a frequency component higher than 0.4 Hz (i.e. the acceleration signal decreases in an inversely proportional manner to the square of the frequency). However, the acceleration integrator 22p has a characteristic which attenuates a frequency component below a frequency higher than that in the normal state (1 Hz in this case: the acceleration signal decreases as the frequency is lowered).

In FIG. 6B, a graph 55 shows the frequency characteristics in the angular velocity integration in the normal state. The angular velocity integrator 13p has a characteristic which performs single integration on a frequency component higher than 0.1 Hz (i.e. the angular velocity signal decreases in an inversely proportional manner to the frequency), and attenuates a frequency component lower than 0.1 Hz (i.e. the angular velocity signal decreases as the frequency is lowered).

A graph 56 shows the frequency characteristics in the angular velocity integration upon activation of the angular velocity meter 96p or when panning. Similarly to the graph 55, the angular velocity integrator 13p has a characteristic which integrates a frequency component higher than 0.1 Hz (i.e. the angular velocity signals decreases in an inversely proportional manner to the frequency). However, the angular velocity integrator 13p has a characteristic which attenuates a frequency component below a frequency higher than that in the normal state (2 Hz in this case: the angular velocity signal decreases as the frequency is lowered).

Figure 6C:
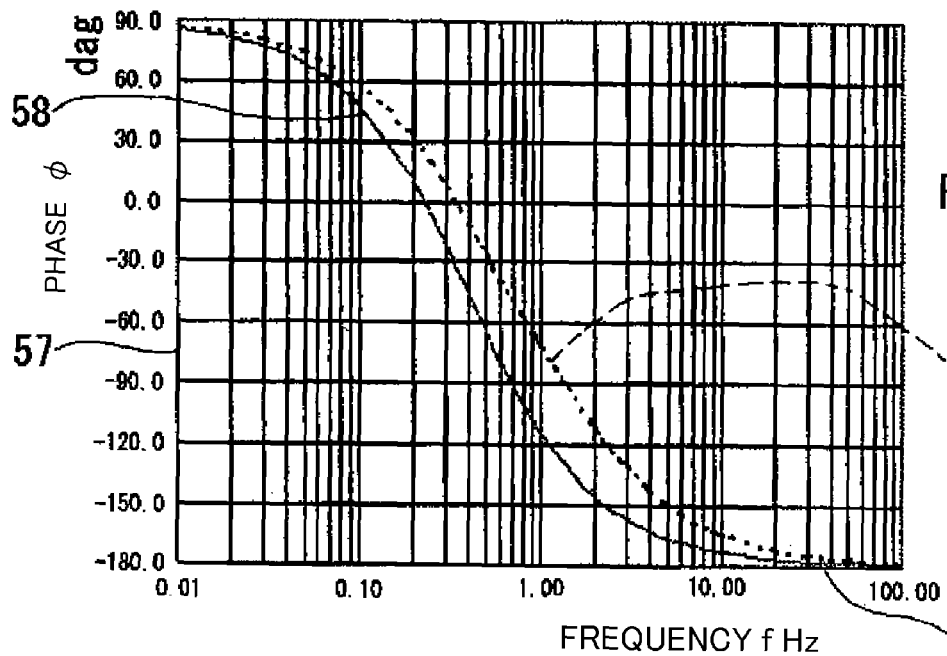
Figure 6D:
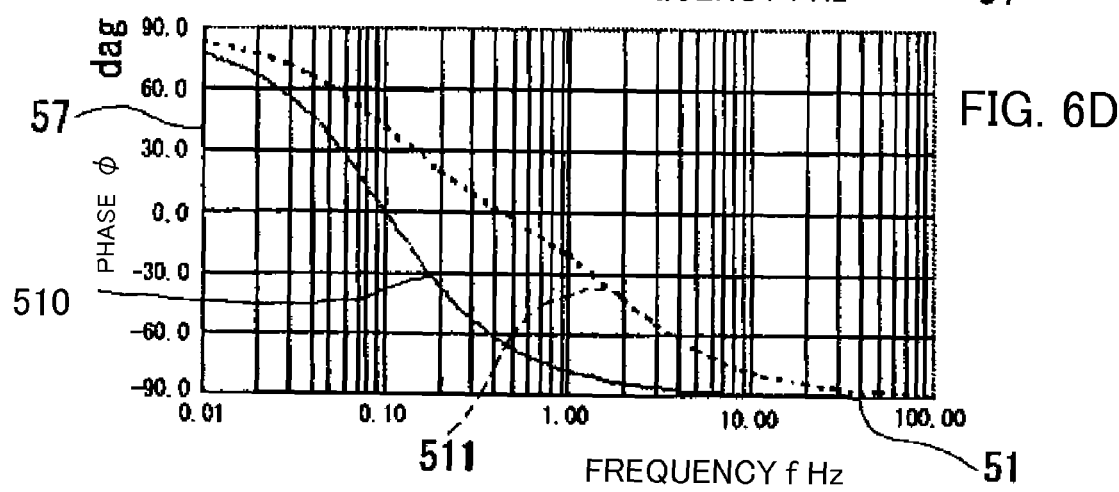

FIGS. 6C and 6D show phase characteristics of the acceleration integrator 22p and the angular velocity integrator 13p, respectively; the horizontal axis 51 shows the frequency, and the vertical axis 57 shows the phase. The phase represents a deviation angle of an output signal from an input signal.

In FIG. 6C, a graph 58 shows the phase/frequency characteristics in the acceleration integration in the normal state. For example, the phase shift of an output relative to an input at 1 Hz is approximately −120 degrees.

A graph 59 shows the phase/frequency characteristics upon activation of the accelerometer 11p or when panning.

In FIG. 6D, a graph 510 shows the phase/frequency characteristics in the angular velocity integration in the normal state. For example, the phase shift of an output relative to an input at 1 Hz is −78 degrees.

A graph 511 shows the phase/frequency characteristics in the angular velocity integration upon activation of the angular velocity meter 96p or when panning.

In comparison with a computation using the integration result on a component of 0.1 Hz as shown in FIGS. 6B and 6D, a computation using the integration result on a component of 0.4 Hz or higher as shown in FIGS. 6A and 6C is represented as "having a narrow signal processing band."

A phase shift and the shake correction accuracy will now be described.

An output (or displacement) obtained by performing a double integration on an acceleration shown in FIG. 6C ideally lags 180 degrees in phase.

This can be explained by the fact that a single integration on a sine wave generates a cosine wave to change in phase by 90 degrees, and a further single integration on the cosine wave generates a minus sine (or a phase of −180 degrees).

If such an ideal integration can be used to compute a displacement, shakes could be perfectly corrected.

However, the ideal integration is not preferable in camera manipulation.

One reason is that all errors of DC components are accumulated.

Therefore, a component of a frequency above a predetermined frequency (for example, 0.4 Hz) is integrated as seen from the frequency characteristics shown in FIG. 6C, and a component of a frequency lower than the predetermined frequency is attenuated.

However, if the integration and the low frequency attenuation are set in this way, the shake correction accuracy in a hand shake frequency band (for example, from 1 Hz to 10 Hz) is reduced.

This is because, as shown in FIG. 6C, the phase shift at 1 Hz is not −180 degrees; the phase lags only up to −120 degrees.

Therefore, image shakes due to a hand shake of 1 Hz cannot be sufficiently corrected.

Incidentally, in the case of a hand shake of 10 Hz, FIG. 6C shows −170 degrees in phase, and the shake correction accuracy is maintained.

The above description has been made as to a problem when it is assumed that the shift shake has the same characteristic as the rotational shake, the problem having been a bottleneck in the shift shake correction so far.

However, detailed investigations on the shift shake have revealed that the shift shake has a different characteristic from that of the rotational shake.

Figure 7:
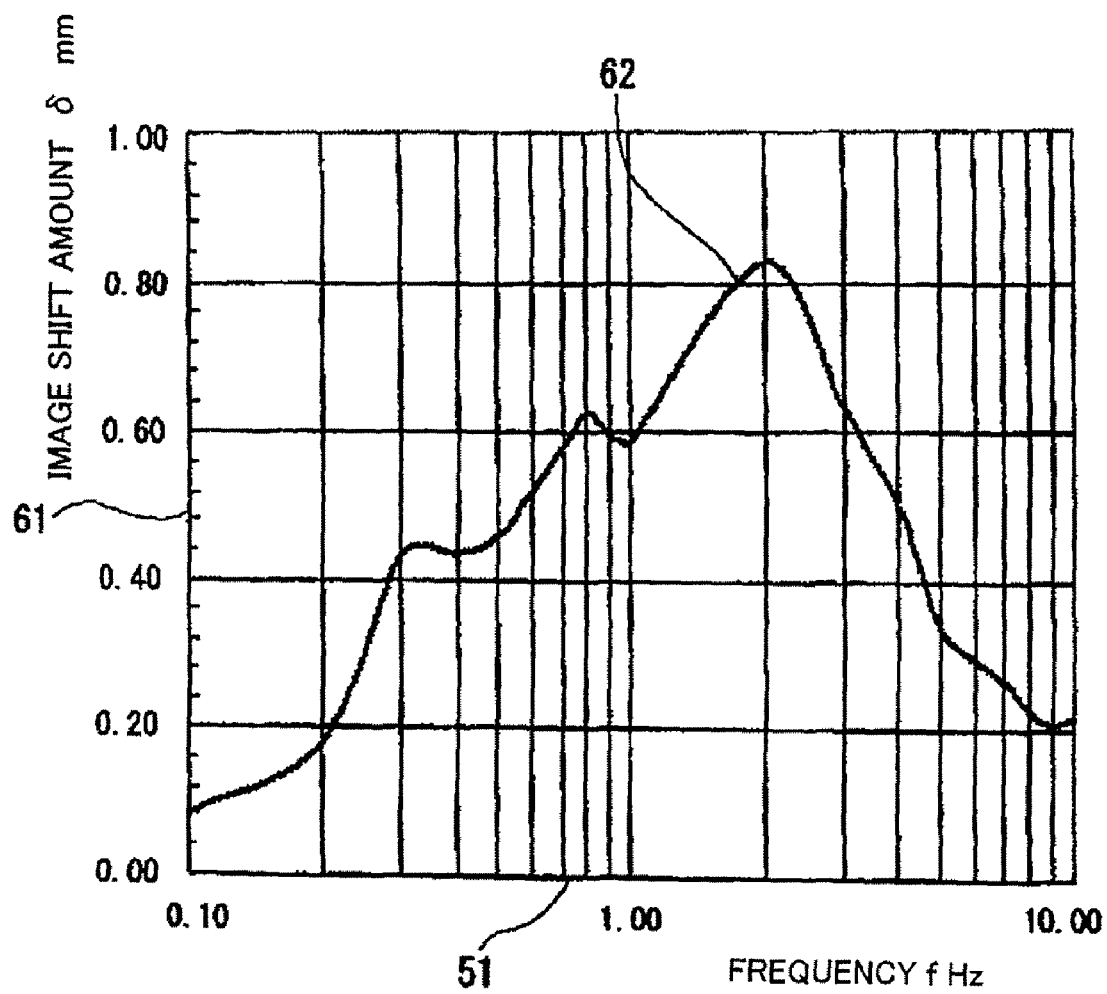
FIG. 7 illustrates the frequency characteristics of shift shakes.

FIG. 7 shows the frequency characteristics of the shift shake; the horizontal axis 51 shows the frequency, and the vertical axis 61 shows the amount of an image shift on the image plane due to the shift shake.

A graph 62 shows the amount of an image shift due to the shift shake, and it has been found that attenuation is observed in both low and high frequencies across 2 Hz.

This indicates that the frequency band is narrower in comparison with the rotational shake (which has a frequency band from 1 Hz to 10 Hz).

Therefore, if the shift shake is corrected with the characteristics shown in FIGS. 6A and 6C, the amount of the image shift on exposure will be acceptable.

Incidentally, an output (or angle) obtained by performing a single integration on the angular velocity shown in FIG. 6D ideally lags 90 degrees in phase.

This can be explained by the fact that a single integration on a sine wave generates a cosine wave to change in phase by 90 degrees.

In FIG. 6D, the phase shift at 1 Hz is −78 degrees, which is close to −90 degrees, so that the rotational shake can be sufficiently corrected.

Here, if the frequency band in which the characteristics shown in FIG. 6D are provided is narrowed as with shift shake, the correction accuracy of the rotational shake is significantly degraded. This is because the rotational shake includes a lower frequency shake than the shift shake.

Using a narrow integration band and a reduced ability of integration in low frequencies as shown in computational characteristics of FIGS. 6A and 6C reduces accumulation of errors superimposed on the accelerometer, so that an acceptable level of accuracy of the accelerometer can be lowered, and therefore a small and lightweight accelerometer can be used.

Additionally, with a small time constant (a characteristic of the integration performed from 0.4 Hz is represented as "having a small time constant" as compared with a characteristic of the integration performed from 0.1 Hz), activation of the computation can be accelerated.

As described above, the rotational shake correction is previously activated, followed by activation of the shift shake correction after an in-focus state is obtained, which will have the benefit of accelerated activation from the small time constant.

Referring now to the characteristics shown in FIGS. 6A and 6B, the graphs vary upon activation and panning as shown in the graphs 54 and 56.

Therefore, the frequency characteristics of the two may possibly be matched upon activation and panning.

However, the frequency characteristics in the normal state are different from each other as shown in the graphs 53 and 55 (the integration band in FIG. 6A is narrower, or smaller in the time constant, than that in FIG. 6B).

The embodiment is characterized in that the computation band for the rotational shake is different from that for the shift shake in the normal state (excepting upon activation and panning).

Although description has been made as to the case where the computation processing bands are different between the angular velocity integrator 13p and the acceleration integrator 22p shown in FIG. 2, the DC removing circuit and the high-frequency attenuation circuit for removing a high-frequency noise component in the amplifiers 12p and 20p may have different computation processing bands. In addition, the combined frequency band of the angular velocity integrator 13p with the amplifier 12p may be different from the combined frequency band of the acceleration integrator 22p with the amplifier 20p.

As described above, the embodiment takes into account the fact that the frequency band of the rotational shake is different from that of the shift shake, and has integration characteristics for the shift shake different from integration characteristics for the rotational shake to reduce accumulation of errors generated in the double integration, so that a small and lightweight accelerometer, which is usable to consumer products, can be used.

Embodiment 2

Figure 8A:
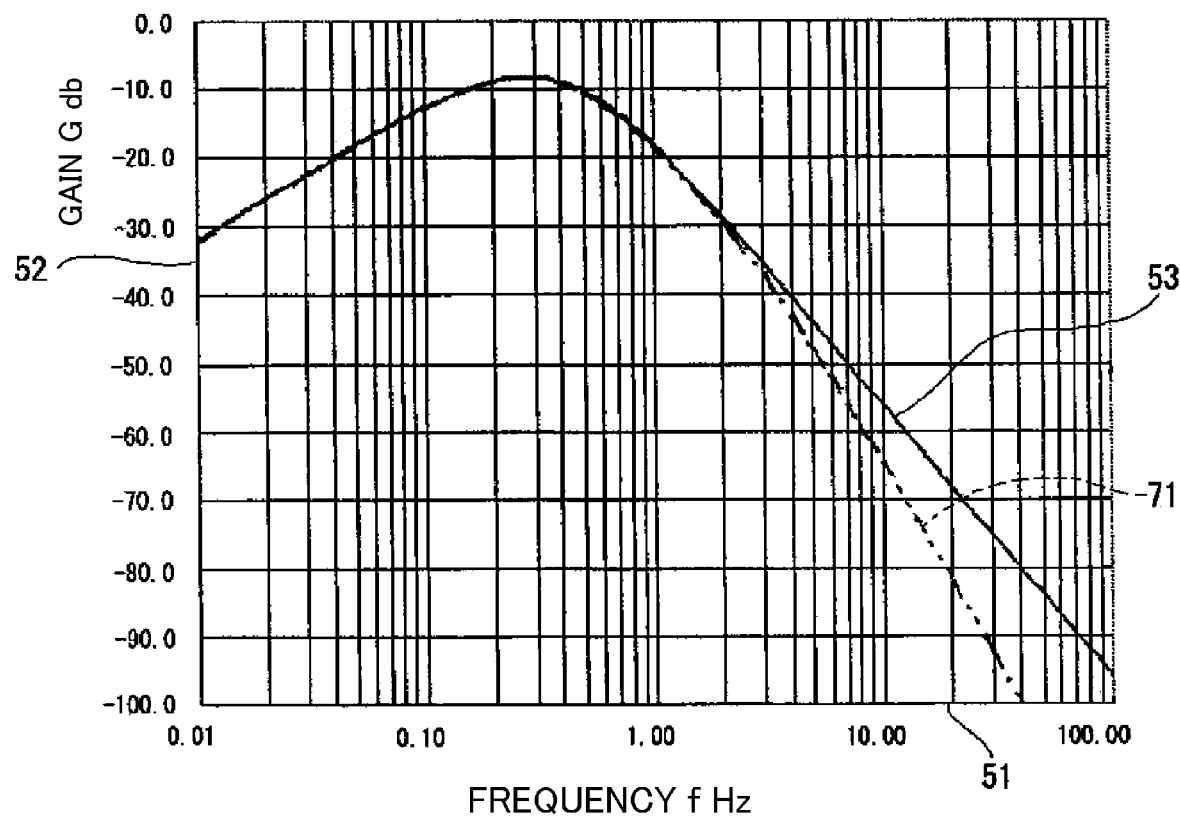
FIGS. 8A and 8B illustrate the frequency characteristics of an acceleration computing unit in Embodiment 2 of the present invention.
Figure 8B:
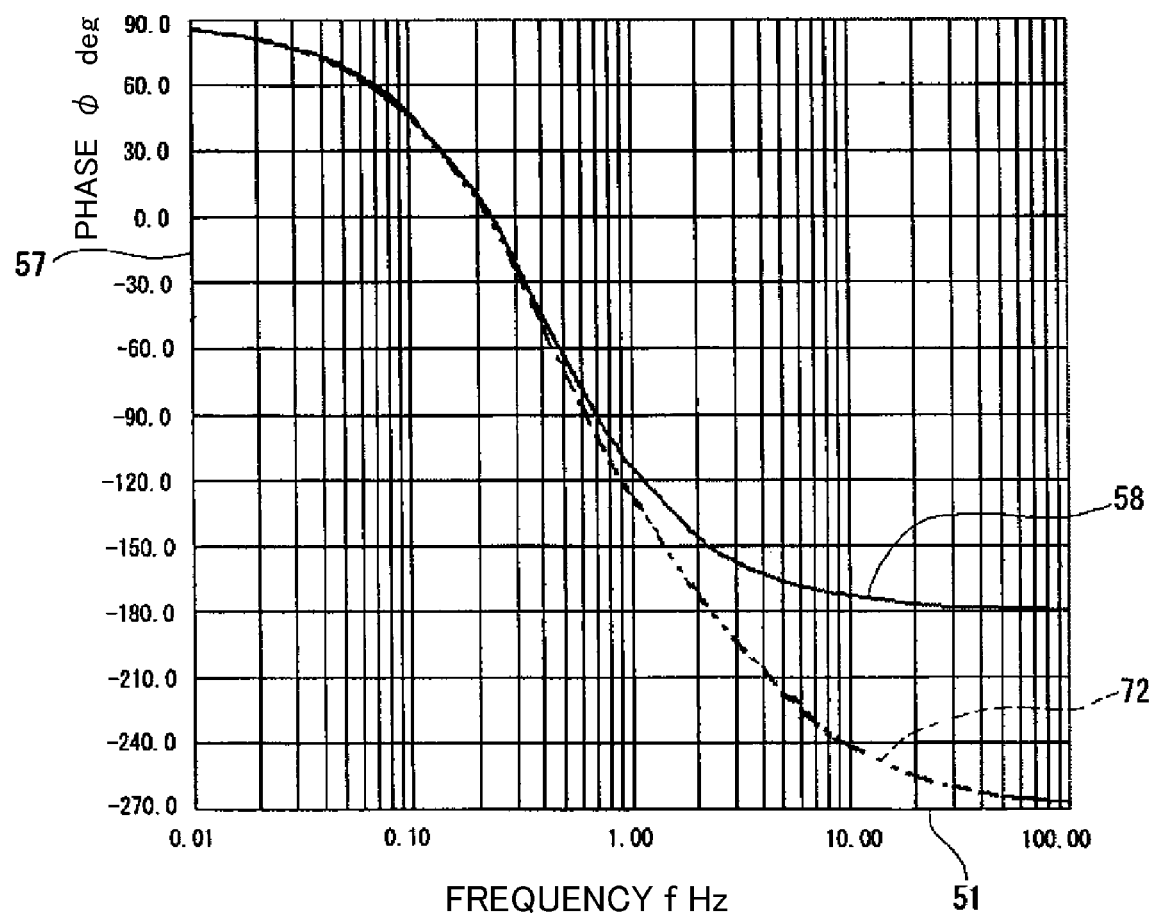

FIGS. 8A and 8B show characteristics of Embodiment 2 according to the present invention. FIG. 8A shows the frequency characteristics of the gain, and FIG. 8B shows the frequency characteristics of the phase.

In FIGS. 8A and 8B, the acceleration integrator 22p is provided with a frequency compensator for causing the phase to lag with respect to the characteristics as shown in FIGS. 6A and 6C. The frequency compensator causes the phase of input signals of a low frequency to lag. Alternatively, it causes the phase of input signals of a lower frequency to lag in comparison with the angular velocity integrator 13p.

The frequency compensator for causing the phase of the input signals of a low frequency to lag is composed of, for example, a low-pass filter, and attenuates signals having a frequency higher than 5 Hz, as indicated by a long dashed double-short-dashed line as a graph 71.

Therefore, the shift shake of 5 Hz or higher cannot be accurately corrected. However, this will not pose a significant problem even without the shake correction because practically little shift shake is present in the frequency band.

However, with the low-pass filter inserted, the phase shift at 2 Hz is compensated close to −180 degrees as shown in a graph 72 in FIG. 8B (in the graph 58, the phase shift at 2 Hz is −148 degrees).

This, therefore, provides for more accurate correction of the shift shake.

The characteristics of the low-pass filter (i.e. 5 Hz or higher is attenuated) may also be variable depending on an image pickup condition of the camera such as the state of a camera shake or the image magnification (for example, 10 Hz or higher is attenuated) so that necessary characteristics are obtained for a particular state.

As described above, the embodiment takes into account the fact that the frequency band of the rotational shake is different from that of the shift shake, and has integration characteristics for the shift shake different from integration characteristics for the rotational shake to reduce accumulation of errors generated in the double integration, so that a small and lightweight accelerometer, which is usable to consumer products, can be used.

Embodiment 3

In Embodiments 1 and 2, the angular velocity integrator 13p and the acceleration integrator 22p in the lens CPU 97 perform computation (for example, a digital filter using the bilinear transformation) to obtain desired integration characteristics and DC cut off characteristics (i.e. attenuation of a low frequency). The computation band of the angular velocity integrator 13p and that of the acceleration integrator 22p are different from each other. Alternatively, a phase compensation filter is provided for the acceleration integrator 22p.

A similar configuration may also be obtained by the amplifiers 12p and 20p that are analog circuits, which are provided before the lens CPU 97. The cooperative operation of the amplifiers 12p and 22p, which are analog circuits, and the angular velocity integrator 13p and the acceleration integrator 22p, which perform digital computation, can process signals separately and optimally for the rotational shake and the shift shake.

Figure 9:
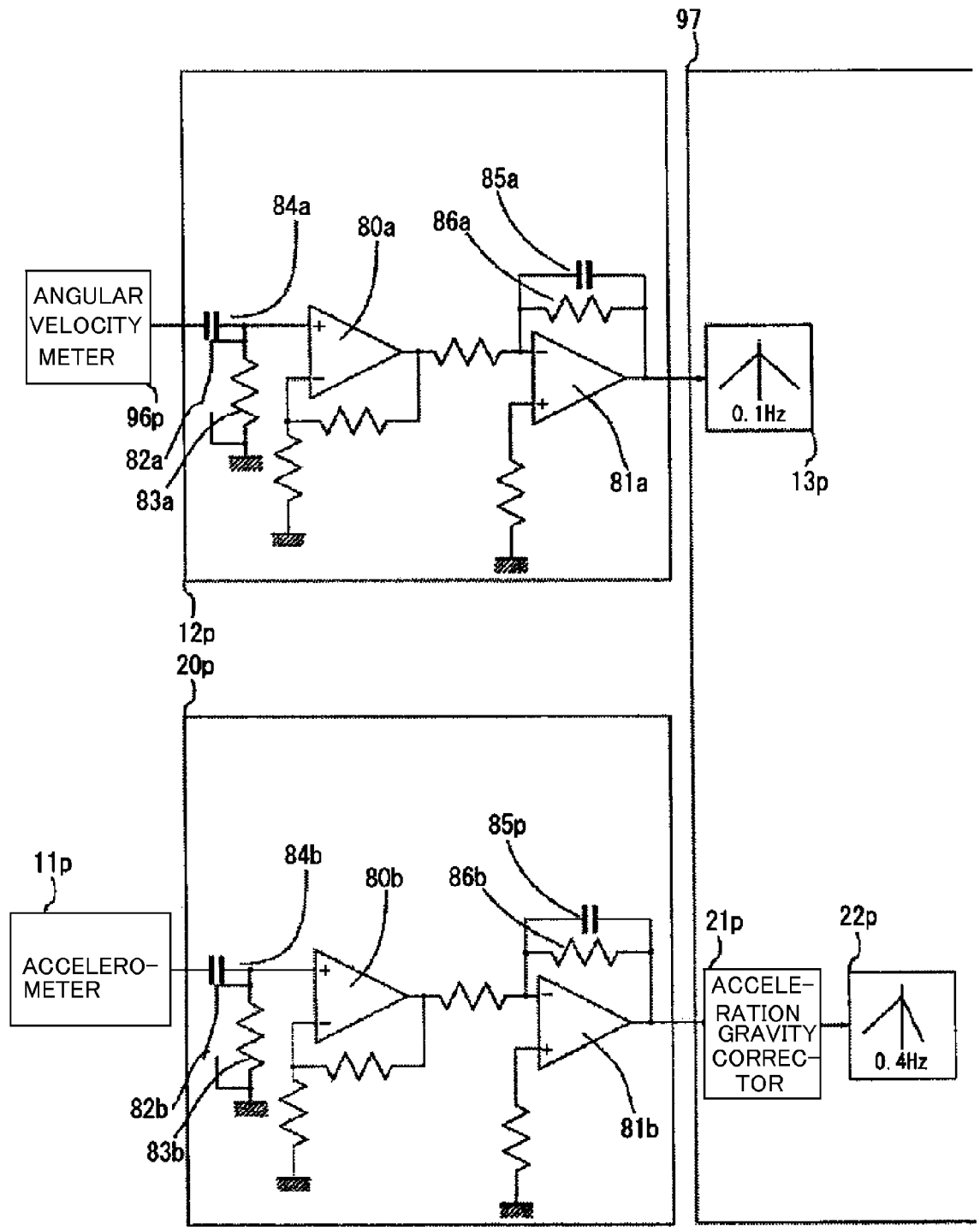
FIG. 9 illustrates an exemplary circuit configuration of an amplifier in Embodiment 3 of the present invention.

FIG. 9 shows an exemplary configuration of the amplifiers 12p and 20p in this case.

In FIG. 9, the amplifier 12p for the angular velocity meter 96p is composed of computation amplifiers 80a and 81a, multiple resistors, and capacitors.

A product of the resistor 83a and the capacitor 84a defines a DC cut off ability (or a low frequency attenuation ability); in this case, for example, the resistor 83a having 1.5 MΩ and the capacitor 84a having 2.0 μF are used to attenuate angular velocity signals having a frequency of 0.05 Hz or lower.

In addition, the computation amplifier 80a has a combined function for the signal as a buffer amplifier and an amplifier having an amplification factor of 40 times.

A product of the resistor 86a and the capacitor 85a defines a high-frequency noise cut off ability (or a high frequency attenuation ability); in this case, for example, the resistor 86a having 200 kΩ and the capacitor 85a having 2.7 nF are used to attenuate angular velocity signals having a frequency of 300 Hz or lower.

A switch 82a switches time constants for DC cut off. Upon activation or when a large panning occurs, the switch 82a causes the capacitor 84a to immediately charge in response to an instruction from the lens CPU 97 so that signals are rapidly stabilized.

The output from the amplifier 12p is input to the lens CPU 97, and digitally integrated and subjected to the DC cut off in the angular velocity integrator 13p.

As shown in a block diagram of the angular velocity integrator 13p of FIG. 9, the digital integration has a characteristic of performing a single integration on a frequency component higher than 0.1 Hz and attenuating a frequency component lower than 0.1 Hz.

Similarly, in FIG. 9, the amplifier 20p of the accelerometer 11p is composed of computation amplifiers 80b and 81b, multiple resistors, and capacitors.

A product of the resistor 83b and the capacitor 84b defines a DC cut off ability (or a low frequency attenuation ability); in this case, for example, the resistor 83b having 400 kΩ and the capacitor 84b having 1.0 μF are used to attenuate acceleration signals having a frequency of 0.4 Hz or lower.

In addition, the computation amplifier 80b has a combined function for the signal as a buffer amplifier and an amplifier having an amplification factor of 40 times.

A product of the resistor 86b and the capacitor 85b defines a high-frequency noise cut off ability (or a high frequency attenuation ability) and is responsible for the phase compensation as described in Embodiment 2. In this case, for example, the resistor 86b having 200 kΩ and the capacitor 85b having 150 nF are used to attenuate acceleration signals having a frequency of 5 Hz or lower.

A switch 82b switches time constants for DC cut off. Upon activation or when a large panning occurs, the switch 82b causes the capacitor 84b to immediately charge in response to an instruction from the lens CPU 97 so that signals are rapidly stabilized.

The output from the amplifier 20p is input to the lens CPU 97, and digitally integrated and subjected to the DC cut off in the acceleration integrator 22p through the acceleration gravity corrector 21p.

As shown in a block diagram of the acceleration integrator 22p of FIG. 9, the digital integration has a characteristic of performing a double integration on a frequency component higher than 0.4 Hz and attenuating a frequency component lower than 0.4 Hz.

In this way, the amplifier 20p is responsible for the phase compensation, so that a phase shift due to the narrow integration band of the shift shake is compensated.

In addition, the DC cut off frequency of the amplifier 20p is at 0.4 Hz; the attenuation starting on a higher frequency side than 0.05 Hz of the amplifier 12p prevents errors in accelerometer outputs from accumulating.

Incidentally, although the example in FIG. 9 shows the case where the integration bands of the angular velocity integrator 13p and the acceleration integrator 22p are different from each other (the acceleration integrator 22p has a smaller integration band), different processing frequency bands may be achieved only in the amplifiers 12p and 20p, with the same integration bands provided for the block.

According to the embodiments described above, a small and lightweight accelerometer can be used to sufficiently correct the shift shake.

Additionally, although description has been made in each Embodiment above as to an exemplary solution for addressing the shift shake to correct an image shake in a digital camera, the image stabilizing apparatus in the embodiments can be constructed in a small and highly stable mechanism, so that the present invention is not limited to the digital camera and it can be applied to a digital video camera, monitoring camera, Web camera, mobile phone and the like.

Although description has been made in the embodiments as to the case where the correction lens 95a is shifted relative to the optical axis 91 to correct image shakes, the present invention may also be applied to the case where the image pickup element 94 is shifted relative to the optical axis 91 to correct image shakes.

Furthermore, the present invention is not limited to these preferred embodiments and various variations and modifications may be made without departing from the scope of the present invention.

What is claimed is:

1. An image stabilizing apparatus comprising:
   an angular velocity detector which detects angular velocity acting on the image stabilizing apparatus;
   an angular velocity computing unit which processes an angular velocity signal obtained by the angular velocity detector, the angular velocity computing unit processing the angular velocity signal with a first cut off frequency;
   an acceleration detector which detects acceleration acting on the image stabilizing apparatus;
   an acceleration computing unit which processes an acceleration signal obtained by the acceleration detector, the acceleration computing unit processing the acceleration signal with a second cut off frequency higher than the first cut off frequency;
   an adder which adds an output signal from the angular velocity computing unit to an output signal from the acceleration computing unit; and
   an image stabilizing mechanism which performs an image stabilizing operation based on an output signal from the adder,
   wherein a gravity acceleration component of the output signal from the acceleration computing unit is corrected using the output signal from the angular velocity computing unit.

2. The image stabilizing apparatus according to claim 1, wherein the acceleration computing unit has a frequency compensation function for providing a phase lag to a low frequency input signal.

3. An optical apparatus comprising:
   the image stabilizing apparatus according to claim 1.

* * * * *